(12) United States Patent
Serafini

(10) Patent No.: US 12,449,004 B2
(45) Date of Patent: Oct. 21, 2025

(54) SEALING DEVICE FOR BEARING UNIT

(71) Applicant: AKTIEBOLAGET SKF, Gothenburg (SE)

(72) Inventor: Andrea Serafini, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 107 days.

(21) Appl. No.: 18/360,175

(22) Filed: Jul. 27, 2023

(65) Prior Publication Data

US 2024/0044374 A1 Feb. 8, 2024

(30) Foreign Application Priority Data

Aug. 5, 2022 (IT) .................. 102022000016638

(51) Int. Cl.
*F16C 33/80* (2006.01)
*B60B 27/00* (2006.01)
*F16C 33/78* (2006.01)

(52) U.S. Cl.
CPC ........ *F16C 33/805* (2013.01); *F16C 33/7823* (2013.01); *F16C 33/7886* (2013.01); *B60B 27/00* (2013.01); *F16C 2326/02* (2013.01)

(58) Field of Classification Search
CPC .... F16C 33/80; F16C 33/805; F16C 2326/02; B60B 27/0073
See application file for complete search history.

(56) References Cited

U.S. PATENT DOCUMENTS 10,920,823 B2 * 2/2021 Krapf .................. F16C 33/7886
2019/0107155 A1 4/2019 Kato

FOREIGN PATENT DOCUMENTS

| DE | 102020106144 A1 | * | 9/2020 | ......... B60B 27/0005 |
| JP | 2015209957 A | * | 11/2015 | .......... F16C 33/7879 |
| WO | 2017221582 A1 | | 12/2017 | |
| WO | WO-2018110626 A1 | * | 6/2018 | .......... F16C 33/7883 |

OTHER PUBLICATIONS

Machine Translation of JP-2015209957-A (Year: 2015).*
Machine Translation of WO-2018110626-A1 (Year: 2018).*
Machine Translation of DE-102020106144-A1 (Year: 2020).*
Search Report and Written Opinion from the Italian Patent Office dispatched Mar. 15, 2023 in related application No. 102022000016638, and translation thereof.

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A sealing device for sealing a bearing unit against external contaminants is arranged substantially inside a cavity of the bearing unit and is provided with two annular metal screens and a sealing element made of elastomeric material. The sealing element is rigidly connected to a rotary one of the two annular screens and is provided with a shaped protrusion projecting radially outwardly from a stationary one of the two annular screens to define, together with the stationary screen, an annular opening of the sealing device. The stationary screen and the sealing element also together defining a drainage and flow channel in communication with the outside of the sealing device through the annular opening, in which the drainage and flow channel is entirely linear and extends in an exclusively radial direction within the sealing device to and from the opening.

7 Claims, 1 Drawing Sheet

SEALING DEVICE FOR BEARING UNIT

CROSS-REFERENCE

This application claims priority to Italian patent application no. 102022000016638 filed on Aug. 5, 2022, the entire contents of which are fully incorporated herein by reference.

BACKGROUND OF THE INVENTION

The present invention relates to a sealing device for a bearing unit, and also relates to a bearing unit fitted with the sealing device.

Known sealing devices typically comprise two metal annular screens, one of which is rotary about a rotation axis while the other is static, arranged opposite one another between an outer ring and an inner ring of a bearing unit to prevent contaminants from entering the bearing unit.

The sealing devices described above further comprise an annular sealing element that is made of elastomeric material, integral with one of the annular screens, and provided with at least one contacting annular sealing lip projecting axially and radially from the related screen towards the opposing screen to prevent the ingress of external contaminants towards the annular sealing lip, and a shaped protrusion not in contact with the opposing screen to define an opening in the sealing device, a deflector plate for contaminants, and a shaped channel for conveying contaminants into and out of the opening.

In the known sealing devices described above, the annular sealing element is anchored to the static screen, and both the annular sealing lip and the shaped protrusion are also static, i.e., not rotary. Therefore, the shaped flow channel is delimited on either one of the sides thereof by the static shaped protrusion, and on the other side by the rotary screen, the rotation of which relative to the static shaped protrusion prevents or hinders the ingress of contaminants into the shaped channel, while simultaneously facilitating the subsequent expulsion thereof, preventing the accumulation of contaminants inside the sealing device. The combination of the static shaped protrusion and the rotation of the rotary screen creates eddies and turbulence in the contaminants, or rather in the contaminant flow, within the shaped channel, subjecting the flow to predominantly centrifugal actions intended both to slow the flow towards the inside of the shaped channel, i.e., toward the rotation axis, and to facilitate the expulsion thereof.

To better understand this combined effect, it should be noted that such a shaped channel is an annular channel distributed about the rotational axis and, since the rotational axis is typically a horizontal axis, the shaped channel has a semi-circular portion arranged vertically above the rotational axis, where the predominantly centrifugal action on the contaminant flow opposes the gravitational action on the contaminant flow, and also has a semi-circular portion arranged vertically below the rotational axis, where the predominantly centrifugal actions on the contaminant flow combine with the gravitational action to expel the contaminants more efficiently, both from the sealing device and obviously from the shaped channel.

As already mentioned, the channel of the sealing device connected to the opening of the sealing device is a shaped channel, i.e., a channel comprising at least one cylindrical portion coaxial to the rotational axis and at least one annular portion transverse to the rotational axis, which have a fluid-dynamic connection at a respective annular elbow, which however creates a significant obstacle to the predominantly centrifugal action of the rotation of the rotary screen and to the gravitational action required to properly expel the contaminants. The presence of such an annular elbow not only slows down the outflow of contaminants, but also represents a potential point of accumulation for the contaminants, with the additional consequence of increased resistance to rotation of the rotary screen, which is detrimental to fuel consumption in vehicles where bearing units fitted with these sealing devices are used.

SUMMARY OF THE INVENTION

The present invention is intended to provide a sealing device for a bearing unit that does not have the aforementioned drawbacks.

The present invention provides a sealing device for a bearing unit having the features set out in the attached claims.

The present invention also relates to a bearing unit, and in particular to a bearing unit for a wheel hub assembly provided with a sealing device according to one of the embodiments of the present invention.

Other preferred and/or particularly advantageous embodiments of the invention are described using the features set out in the attached dependent claims.

BRIEF DESCRIPTION OF THE SEVERAL VIEWS OF THE DRAWINGS

The invention is described below with reference to the attached drawings, which show a non-limiting example embodiment thereof, in which.

DETAILED DESCRIPTION OF THE INVENTION

Figure 1:
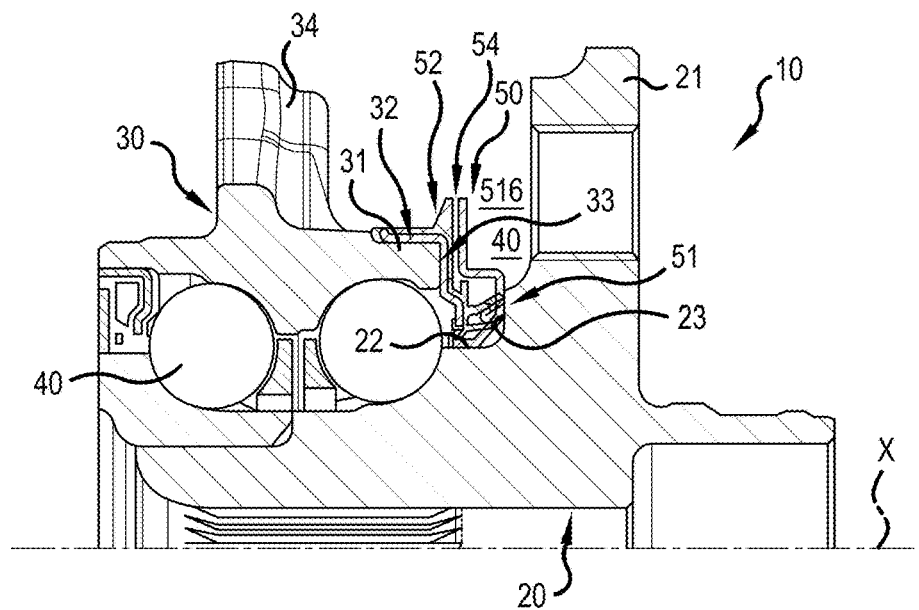
FIG. 1 is a cross section of a preferred embodiment of a bearing unit according to the present invention.

In FIG. 1, reference sign 10 indicates a bearing unit as a whole, preferably a vehicle wheel hub assembly, having a central rotational axis X, and comprising a radially inner rotary flanged ring 20, a radially outer stationary ring 30, and a plurality of rolling bodies 40, in this example balls, interposed between the rings 20 and 30 to enable the relative rotation thereof.

In particular, the ring 30 is coaxial with the axis X and is provided with:

- a flange 34 transverse to the axis X and couplable with an upright (not shown) of a vehicle, and
- a tubular appendage 31 rigidly connected to the flange 34 and delimited in the radial direction by an outer cylindrical surface 32, and in the axial direction by an annular surface 33 adjacent and transverse to the cylindrical surface 32.

The flanged ring 20 is in turn provided with:

- a flange 21 transverse to the axis X arranged in front of the tubular appendage 31 and coupled in a known manner to a vehicle wheel (known and not illustrated),
- a cylindrical mounting surface 22 or seat arranged substantially at a root of the flange 21, and
- a butting surface 23 connected to the surface 22 and axially delimiting the flange 21.

The rings 20 and 30 and the rolling bodies 40 together define a wheel hub assembly, which is designed to enable a wheel (known and not illustrated) connected to the flange 21 to rotate with respect to an upright (known and not illustrated) connected to the flange 34. For the sake of full disclosure, throughout this description and in the claims, terms and expressions indicating positions and orientations such as "radial" and "axial" are understood to refer to the central rotational axis X of the bearing unit 10. On the other hand, expressions such as "axially external" and "axially internal" refer to the assembled state of the wheel hub assembly, and in this case preferably refer to a wheel side and to a side opposite the wheel side respectively.

The flanged ring 20 with the tubular appendage 31, or rather the surfaces 22, 23 and 32, together define a cavity 40 that, if not properly screened, enables impurities and contaminants such as water, mud, dust, and the like to enter the bearing unit 10, i.e., the wheel hub assembly. Therefore, in order to screen the bearing unit 10, a sealing device 50 according to the present invention, is mounted substantially within the cavity 40 and comprises two metal annular screens 51 and 52, facing each other, of which the screen 51 can be rotated about the rotational axis X and is rigidly connected to the flanged ring 20, and the screen 52 is static and rigidly connected to the ring 30.

Figure 2:
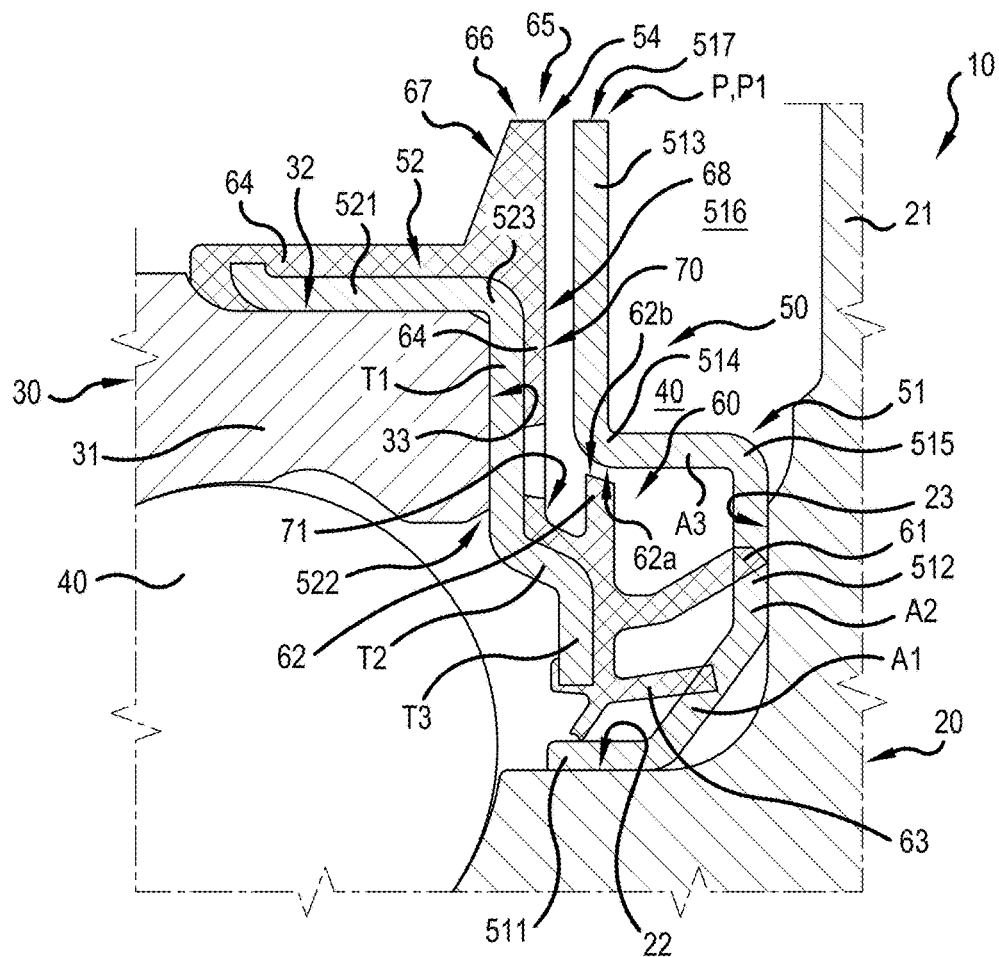
FIG. 2 is a magnified view of an element in FIG. 1, specifically a preferred embodiment of a sealing device for a bearing unit.

As best illustrated in FIG. 2, the screen 52 is fitted to the tubular appendage 31 of the ring 30, and in turn comprises a cylindrical mounting portion 521 interference fitted to the surface 32 of the tubular appendage 31, and a shaped flanged portion 522 rigidly connected to the mounting portion 521 at an elbow 523 of the screen 52, butting axially against the surface 33 and extending radially inward from the mounting portion 521 toward the cavity 40 and toward the mounting surface 22, without however coming into contact with the mounting surface 22. The flanged portion 522 is shaped, i.e., not solely transverse to the axis X, comprising three sections T1, T2, and T3, specifically:

section T1 is transverse to the axis X and is arranged adjacent to the surface 33, section T3 is also transverse to the axis X, is axially offset toward flange 21 from section T1, and is arranged about the surface 22, and section T2 is arranged between sections T1 and T3, and is a conical section decreasing towards the flange 21 such as to position the section T3 further into the cavity 40 and is axially offset from section T1, i.e., also from the surface 33.

The screen 51 is fitted to the cylindrical mounting surface 22 of the flange 21 axially adjacent to the flange 21, which in turn comprises:

a cylindrical mounting portion 511 interference fitted onto the mounting surface 22, an accumulation portion 512 arranged adjacent to the butting surface 23 and connected to the mounting portion 511 to form, together with the portion 511, an inverted C in a section of the bearing unit 10 and the sealing device 50 including the axis X, and a flanged portion 513 transverse to the axis X and rigidly connected to the accumulation portion 512 at an annular elbow 514 of the screen 51 is directed radially outward from the cavity 40, and is radially delimited by a cylindrical free edge 517. The flanged portion 513 is also substantially aligned in the axial direction with the section T3 of the flanged portion 513.

The accumulation portion 512 is also shaped and comprises three sections A1, A2, and A3, specifically:

section A1 is a conical section that widens toward the flange 21, is connected to the mounting portion 511, and forms an obtuse angle therewith, section A3 is a cylindrical section connected by the annular elbow 514 to the flanged portion 513, and section A2 is transverse to the axis X, is arranged adjacent to the surface 23, is rigidly connected both to the section A1, forming another obtuse angle therewith, and to the section A3 at an additional annular elbow 515 of the screen 51.

The two elbows 514 and 515 form respective right angles, and are radially aligned with each other. Furthermore, the two elbows 514 and 515 are arranged radially below the surface 32 in front of the surface 33, and the radial position thereof determines both a radial dimension of the accumulation portion 512 and a radial position within the cavity 40 of the section A3, which, together with the flanged portion 513 and the flange 21, defines an accumulation groove 516, i.e. an external drainage chamber open radially to the outside, within which contaminants and debris can accumulate and be expelled by the centrifugal forces exerted by the rotation of the ring 20 and the related flange 21, as well as by the force of gravity.

The sealing device 50 further includes an annular sealing element 60, which is made of elastomeric material rigidly connected to the screen 52, and is provided with at least one annular sealing lip 61, projecting axially and radially from the screen 52 toward the screen 51 and coming into contact with the section A2 of the screen 51, and a non-contacting, radial sealing lip 62 projecting radially from the screen 52 towards the elbow 514 of the screen 51 to form a labyrinth 62a with the elbow 514, i.e., a small radial passage intended to prevent impurities and contaminants from entering the accumulation portion 512. In the preferred example embodiment of the present invention described herein, the annular sealing element 60 is provided with an additional annular sealing lip 63, projecting axially and radially from the screen 52 toward the screen 51 at a position radially inside the annular sealing lip 61, and in contact with the section A1 of the screen 5.

In particular, the two lips 61 and 63 are arranged substantially at the section T3, which, as described above, is axially offset from the section T1 towards the flange 21 such as to minimize the overall length of the two lips 61 and 63, thereby making the lips even stronger and more robust. Indeed, the two lips 61 and 63 are arranged within the concavity of the accumulation portion 512 in sliding contact with the accumulation portion 512 and are designed to block and possibly accumulate any contaminants coming into contact with the lips within the accumulation portion 512, preventing the contaminants from moving further towards the bearing unit 10. In other words, the accumulation portion 512 defines an internal drainage chamber, the volume of which also depends on the presence of the lips 61 and 63.

As described above, the sealing device 50 can be fitted either with a single sealing lip 61 or 63, or with both sealing lips 61 and 63 depending on the intended use of the bearing unit 10. When the sealing lip 63 is used on its own, the accumulation volume inside the accumulation portion 512 is larger than the accumulation volume when the lip 61 is used on its own or in combination with the lip 63.

In all of these cases, however, the labyrinth 62a enables drainage of any contaminants that may have entered the concavity of the accumulation portion 512. In particular, such drainage is also facilitated by the fact that the sealing lip 62 is delimited by a conical surface 62b that tapers towards the channel 70 forming a guide for contaminants, in particular when the screen 51 is rotating.

Furthermore, the sealing element 60 also includes a coating layer 64 of the sections T2 and T1, as well as of the mounting portion 521, and a shaped protrusion 65 that protrudes radially outward parallel to the flanged portion 513 from the coating layer 64 at the elbow 523, and is delimited radially outward by a cylindrical free edge 66 radially aligned with the cylindrical free edge 517 of the flanged portion 513 to define an annular opening 54 of the sealing device 50 with the edge 517.

The opening 54 is an exclusively or entirely radial opening facing radially outwards from the axis X and the bearing unit 10, and extending about an entire outer annular perimeter P of the sealing device 50. Since the rotational axis X is a substantially horizontal axis, there are two distinct semi-circular perimeters P1 and P2 about the annular perimeter P, the perimeter P1 being arranged vertically above the axis X and the perimeter P2 (not illustrated but easily inferred from the description) being arranged vertically below the axis X.

The shaped protrusion 65 is further delimited, from the side opposite the flanged portion 513, by a conical surface 67 intended to deflect contaminants and debris directed toward the bearing unit 10 beyond the annular opening 54, thereby preventing most of these contaminants and debris from entering the sealing device 50 through the opening 54, and is delimited on the side of the flanged portion 513 by an annular surface 68 transverse to the axis X that defines, in line with the coating layer 64 of the section T1 and with the flanged portion 513, a drainage and flow channel 70 for any contaminants coming into or out of the opening 54. The shaped protrusion 65 is therefore also a deflector plate for intercepting contaminants and impurities before the contaminants and impurities come into contact with the opening 54, diverting such contaminants and impurities away from the opening 54.

The drainage and flow channel 70 is an entirely linear channel of constant axial width over the entire length L1 thereof, and extends transversely to the axis X in an exclusively or entirely radial direction within the sealing device 50 from the opening 54 to the elbow 514 to open, radially beyond the elbow 514, into an accumulation groove 71 defined by the lip 62 and the coating layer 64 of the sections T1 and T2. This accumulation groove 71 also acts as an additional internal drainage chamber, making it more difficult for contaminants to enter the drainage chamber defined by the accumulation portion 512, with which this additional drainage chamber communicates via the labyrinth 62a.

The accumulation groove 71 increases the turbulent and vorticose motion (i.e., a swirling motion) of the contaminants, or rather of the contaminant flow in the sealing device 50, and any contaminants and/or debris accumulating in the groove 71 are easily expelled by virtue of the entirely linear shape and constant axial thickness of the channel 70, as well as the direct and linear communication of the groove 71 with the drainage and flow channel 70.

More specifically, the drainage and flow channel 70 is delimited on one side by the shaped protrusion 65, or rather the annular surface 68 thereof, and the coating layer 64 of the section T1 that are rigidly connected at an angle to the screen 52, and on the opposite side by the flanged portion 513 of the screen 51, which is fitted on the rotary ring 20 and also rotary about the X axis. The relative rotation of the flanged portion 513 with respect to the annular surface 68 and the coating layer 64 makes any contaminant flow that has penetrated the sealing device 50 through the opening 54 vorticose and turbulent, and predominantly subject to the centrifugal actions of the flanged portion 513 of the screen 51 intended both to slow the movement thereof into the channel 70, i.e., movement toward the rotational axis X, and primarily to facilitate the expulsion thereof, including the linear expulsion, thereby preventing accumulation, even where accumulation areas (such as the accumulation groove 71 or the inside of the accumulation portion 512) have been provided as a precautionary measure, and to increase the sealing capabilities of the sealing device 50, thereby enhancing this capacity as well as the durability of the annular sealing lips 61 and 63.

As mentioned above, the opening 54 and the channel 70 are exclusively or entirely radial, and the effect of the relative rotation of the flanged portion 513 with respect to the annular surface 68 and the coating layer 64 on the contaminant flow, i.e., the effect of centrifugal forces on the contaminant flow, can be combined with the effect of gravity, depending on the semi-circular portion of the opening 54 and the channel 70 involved. Indeed, about the upper perimeter P1, the effect of the centrifugal forces that tend to expel the contaminants from the opening 54 opposes the effect of the gravitational force, which conversely tends to push the contaminants into the channel 70. Conversely, about the lower perimeter P2, the effect of the centrifugal forces that tend to expel the contaminants from the opening 54 is augmented by the effect of the gravitational force, which tends to push the contaminants out of the channel 70 in that area. It should be noted that the rotation of the flange 21 about the axis X also causes the rotation of the accumulation groove 71, which, when oriented towards the perimeter P1, tends to accumulate contaminants, while when oriented towards the perimeter P2, tends to discharge the contaminants towards the channel 70, the radial linearity of which facilitates the drainage and expulsion of the contaminants.

Advantageously, according to the present invention, the drainage effect of the channel can be more or less amplified by acting on the radial length L1 thereof, and similarly by shifting the radial position of opening 54 toward or away from the X axis. Specifically, the radial length L1 of the channel 70 can be altered, depending on the severity of the operating conditions of the bearing unit 10, by simply increasing or decreasing both a radial length of the flanged portion 513 and a projecting radial length of the shaped protrusion 65 of the coating layer 64. Increasing the radial length of the flanged portion 513 and the projecting radial length of the shaped protrusion 65 also increases the radial length L1 of the channel 70, which increases the intensity of the centrifugal action on the contaminates, as well as the capacity of the shaped protrusion 65, or rather of the surface 67 thereof, to deflect contaminants away from the opening 54. In any case, this innovative channel 70 and the potential synergistic action with the accumulation groove 71 and the lip 62, make the quantity of contaminants able to reach the pair of sealing lips 61 and 63 remarkably low, enabling the lips 61 and 63 to function in a less severe environment.

Also advantageously, according to the present invention, the draining effect of the sealing device 50 is further emphasized by the fact that, as already described, both the opening 54 and the channel 70 are exclusively radial, i.e., the drainage and flow channel 70 is an entirely linear channel with a radially oriented outlet represented by the opening 54 lying entirely within a cylindrical plane. The radial linear continuity of the channel 70 with the opening 54 enables the uninterrupted drainage of any contaminants that have entered the sealing device 50.

There are numerous other variants in addition to the embodiment of the invention described above. Furthermore, the disclosed embodiments are merely examples that limit neither the scope nor the application nor the possible arrangements of the invention. In fact, although the above description enables a person skilled in the art to carry out the present invention according to at least one example embodiment thereof, many variants of the described components can also be used without thereby moving outside the scope of the invention as defined in the attached claims, which should be understood literally and/or according to the legal equivalents thereof.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A sealing device for sealing a bearing unit against external contaminants, the bearing unit having a stationary ring and a rotary ring, the sealing device having a central axis and being arranged at least partially inside a cavity between the stationary ring and the rotary ring and comprising:
    a first metal annular screen mounted on the rotary ring;
    a second metal annular screen mounted on the stationary ring; and
    a sealing element made of elastomeric material, rigidly connected to the second screen and including at least one contacting sealing lip projecting axially and radially from the second screen toward the first screen and a shaped protrusion projecting radially outward from the second screen to define, with the first screen, an annular opening in the sealing device, the first screen and the sealing element together further defining a drainage channel in communication with the outside of the sealing device through the annular opening, the drainage channel being entirely linear and extending transversely to the central axis in an exclusively radial direction inside the sealing device to and from the opening;
    wherein the sealing element includes a non-contacting radial sealing lip projecting entirely radially from the second screen toward an axial section of the first screen to form both a radial labyrinth to prevent impurities and contaminants from entering the sealing device and an accumulation groove arranged at an internal outlet of, and radially aligned with, the drainage channel.

2. The sealing device according to claim 1, wherein the opening is an exclusively radial opening, facing radially outwards from the axis and the sealing device.

3. The sealing device according to claim 2, wherein the drainage channel and the opening are aligned radially with each other.

4. The sealing device according to claim 1, wherein the shaped protrusion projecting radially outwards from the first screen is a deflector configured to intercept contaminants and impurities before the contaminants and impurities come in contact with the opening, the shaped protrusion being provided with a conical deflection surface.

5. The sealing device according to claim 4, further comprising an outer drainage chamber defined by the first screen and the rotary ring and an inner drainage chamber defined by the accumulation groove, the inner drainage chamber communicating directly and linearly with the drainage channel.

6. A bearing unit provided with a sealing device according to claim 1, the bearing unit further comprising a plurality of rolling bodies disposed between the flanged ring and the stationary ring.

7. A sealing device for sealing a bearing unit against external contaminants, the bearing unit having a central axis, a stationary ring and a rotary ring rotatable about the central axis, a cavity being defined between the stationary ring and the rotary ring, the sealing device comprising:
    a first metal annular screen mounted on the rotary ring and disposed at least partially within the cavity;
    a second metal annular screen mounted on the stationary ring and disposed at least partially within the cavity; and
    an elastomeric sealing element rigidly connected to the second screen and including at least one sealing lip projecting axially and radially from the second screen toward the first screen and a shaped protrusion projecting radially outward from the second screen such that an annular opening is defined between the shaped protrusion and the first screen, the first screen and the sealing element defining a drainage channel in communication with the outside of the sealing device through the annular opening, the drainage channel being entirely linear and extending transversely to the central axis in an exclusively radial direction inside the sealing device to and from the opening;
    wherein the sealing element includes a non-contacting radial sealing lip projecting entirely radially from the second screen toward an axial section of the first screen to form both a radial labyrinth to prevent impurities and contaminants from entering the sealing device and an accumulation groove arranged at an internal outlet of, and radially aligned with, the drainage channel.

\* \* \* \* \*